United States Patent [19]

Grieu et al.

[11] Patent Number: 5,003,520

[45] Date of Patent: Mar. 26, 1991

[54] TIME ACCOUNTING SYSTEM, IN PARTICULAR FOR PARKING SUBJECT TO CHARGE

[75] Inventors: Francois Grieu; Frédéric Levy, both of Paris, France

[73] Assignee: Societe Internationale Pour L'Innovation S.A., Paris, France

[21] Appl. No.: 309,792

[22] PCT Filed: May 11, 1988

[86] PCT No.: PCT/FR88/00232

§ 371 Date: Feb. 23, 1989

§ 102(e) Date: Feb. 23, 1989

[87] PCT Pub. No.: WO88/09022

PCT Pub. Date: Nov. 17, 1988

[30] Foreign Application Priority Data

May 14, 1987 [FR] France .................. 87 06776

[51] Int. Cl.⁵ .......................... G04F 1/00; G07B 15/00
[52] U.S. Cl. ...................................... 368/90; 194/902; 235/380
[58] Field of Search .............. 368/10, 90, 92; 235/377–381; 194/211, 900–902

[56] References Cited

U.S. PATENT DOCUMENTS

| 3,771,916 | 7/1976 | Moreno | 235/61.7 B |
|---|---|---|---|
| 4,231,458 | 11/1980 | Limone | 194/4 F |
| 4,717,815 | 1/1988 | Tomer | 235/378 |
| 4,730,285 | 3/1988 | Lie | 368/90 |
| 4,876,540 | 10/1989 | Berthon et al. | 368/90 |

FOREIGN PATENT DOCUMENTS

| 0034570 | 8/1981 | European Pat. Off. . |
|---|---|---|
| 2547083 | 12/1984 | European Pat. Off. . |
| 0142013 | 5/1985 | European Pat. Off. . |
| 0165165 | 12/1985 | European Pat. Off. . |
| 0173813 | 3/1986 | European Pat. Off. . |
| 3143047 | 5/1983 | Fed. Rep. of Germany . |
| 3543067 | 7/1986 | Fed. Rep. of Germany . |
| 3514620 | 10/1986 | Fed. Rep. of Germany . |
| 2503423 | 10/1982 | France . |
| 2594985 | 8/1987 | France . |
| 2158628 | 11/1985 | United Kingdom . |

Primary Examiner—Vit W. Miska
Attorney, Agent, or Firm—Roland Plottel

[57] ABSTRACT

A time accounting system for accounting parking subject to charge periods which includes a card having an electronic memory in which each memory location can be individually and irreversibly written in order to represent a time unit credit allocated to the holder of the card. The system also includes a portable case in which the card can be inserted and which has an internal clock circuit and a coupling circuit, as well as a writing circuit. The case is designed with means for temporary storage of a time unit credit which is activable if the time credit remaining in the inserted card is less than the parking time of the holder.

15 Claims, 6 Drawing Sheets

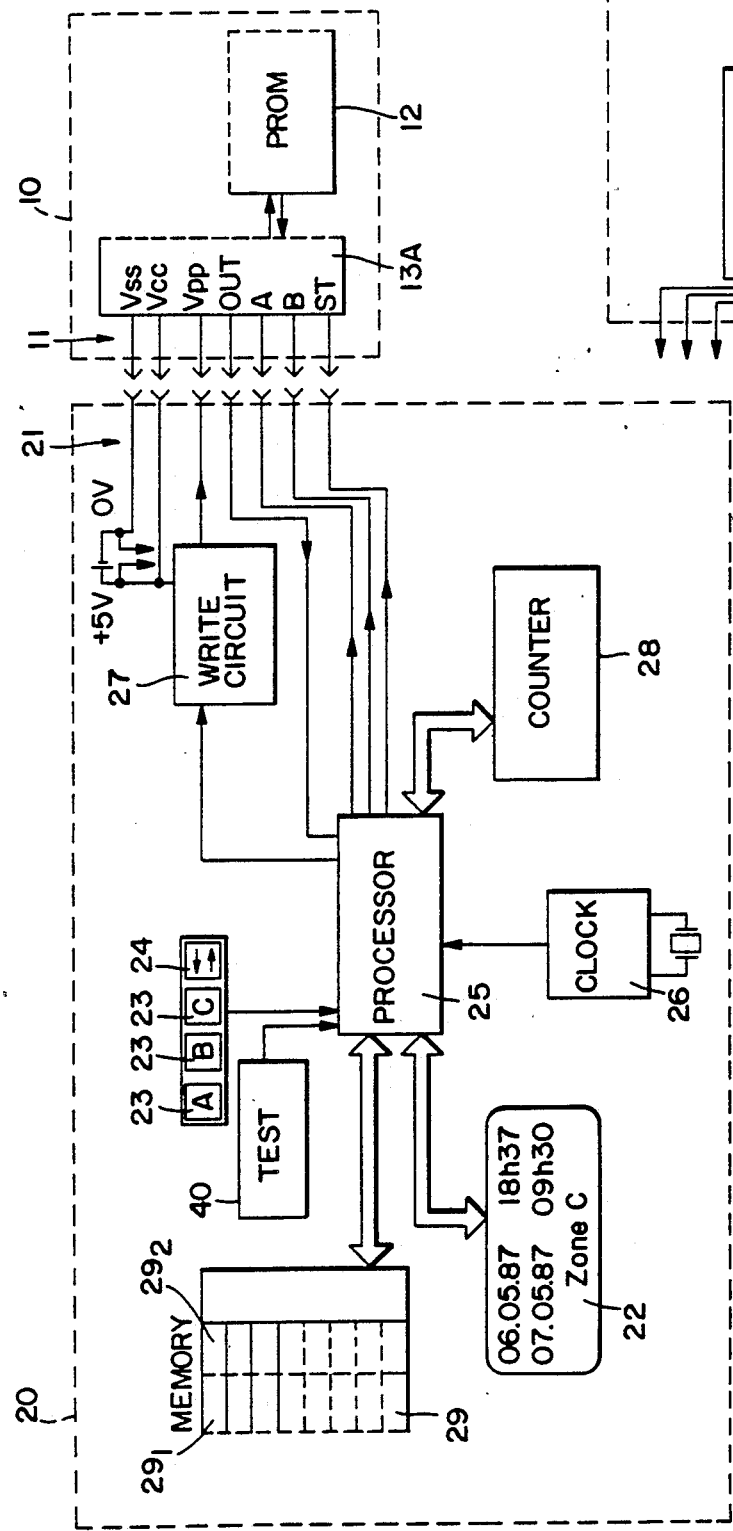
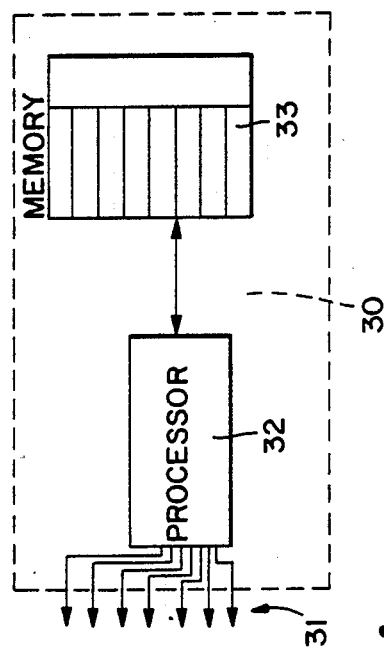
FIG.3
FIG.4

TIME ACCOUNTING SYSTEM, IN PARTICULAR FOR PARKING SUBJECT TO CHARGE

The present invention relates to a system of time accounting. It applies, in particular, to the accounting of parking subject to charge periods. However, this application is not limited and can be applied to any situation where it is necessary to account for time by gradual consumption, as time elapses, using units of credit having a preassigned duration with respect to the user.

The current used parking accounting systems are based principally on the use of individual (parking meters) or collective (time-date ticket dispensers) posts operated by coins or, in closed parking areas using magnetic tickets which record the time of arrival and trigger the opening of a barrier after the payment of an amount indicated by an automatic coin machine or to a cashier.

It has also been proposed (see more particularly GB-A-2 158 628) to replace coins by prepaid electronic tickets and time stamps or other coin devices by individual cases made available to users, which would be put behind their windshield and which would automatically debit the prepaid ticket by the amount corresponding to the real parking time while also displaying data intended both for the user (balance remaining in ticket, allowed parking limit period), and for supervisory personnel (overrun of the authorized parking period).

Such an "electronic ticket" could notably include an electronic memory in which each memory location could be written-in individually and irreversibly while each of the memory locations would represent a credit in consumed time units, one after the other, by successively writing into the corresponding memory locations. Unlike magnetic tickets, the memory (which can appear in the form of a card is not rechargeable, thus considerably limiting any risks of fraudulent use.

Such a system has the advantage of relieving the user of the necessity to have coins with him, or to have exact change. In addition, he only pays for the real parking time and not a greater amount corresponding to a maximum pre-estimated length of time.

However, if such a system is to be put into effective practice, there is a problem related to the use of previously used cards which contain only a small residual balance of parking time units.

Indeed, if this residual balance (or remainder) is very small, the user will have no recourse other than to abandon the corresponding credit in such a way that the card will have cost him more than the usage to which it has been put (unless a procedure of restitution and reimbursement of the cards is established by the authority which issues them; obviously this procedure would be difficult to manage).

If, on the contrary, this balance, however small, corresponds to the usable value, the user might not risk using it immediately because, since he would rarely know the exact length of time he will be parking for, he would tend to over-estimate such periods and prefer to insert a fresh or barely used card.

These difficulties mean that the user will finally have a high number of cards which have been started and which would render the system relatively impractical.

It will be noted that this drawback is more apparent in the case of cards with a moderate nominal value which will therefore be quickly consumed, whereas it is precisely desirable to propose cards having a moderate nominal value to favor the acceptance of the system by the public.

One of the objects of the present invention is to completely eliminate these difficulties by resolving the problem of using the remainders in the cards.

For this purpose, according to the invention, the unit is to be provided a temporary storage means for credit in time units, activable if the duration credits subsisting in the card inserted into the unit is less than the parking time clocked by the user.

More particularly, the invention proposes that the case should be provided with a time unit accumulator which the user will charge by the remainder in one or several started cards which he could therefore "dump" into the case for subsequent consumption. Then if necessary, he would insert another card which will only begin to be consumed once the accumulator has been fully discharged.

The charging of the accumulator could be carried out at the command of the user (who would press a button provided for this purpose) and/or automatically by the case, if it detects that the balance of the card is less than a given threshold.

As an alternative, or as an addition to the accumulator, it is possible that the case can operate on an "overdraft" basis i.e. that it continues to operate normally even if the total amount of the time unit credit on the card inserted has been used up, and will only issue a warning signal once a maximum authorized overdraft value has been exceeded. Naturally, during the subsequent insertion of a new card, it will be debited (automatically or under the control of the user) by the value of the overdraft reached while the overdraft accounting means will be simultaneously reset to zero.

As an alternative or as an addition to the accumulator it is also possible to have the unit operate with a "constant credit" or a "time unit buffer" value during its operation. The buffer time units are first consumed and may be constituted subsequently, independent of the consumption, by the insertion of a card and the entry of a command (automatic or by user) to reload the buffer.

According to another aspect of this invention, the system can be generalized to several municipalities, so that the user can use, in any municipality, a single card purchased on the spot or in another municipality.

For this purpose a clearing system will be provided to distribute the amounts obtained from the sale of cards between the different municipalities according to the real utilization of the cards sold (for instance, as a function of the total number of hours parked in each municipality).

For this purpose, the case will include an account memory wherein the successive uses of data (code representing the place of use and the number associated with the entered memory locations) will be stored gradually so that the consumed time units can subsequently be imputed to a determined beneficiary related to the location where these units are consumed. The case also includes inhibiting means to prevent any use of the case by its holder once a certain overrun (duration, consumption, etc.) has been achieved thus compelling the holder to request periodically the restoration of his case against transfer to an external device of the accounting data contained therein.

The system then includes, in addition to the cards and individual cases, at least one transfer device receiving the cases transfer the account data from the cases to this transfer device so as to permit subsequent determination, for each beneficiary, of a ratio proportional to the number of time units consumed and to distribute to each of them a fraction of the product of the sales of the cards as a function of this ratio.

The account memory of the case could be rendered separable thereof to facilitate the transfer of data contained therein.

It is also possible to provide for auxiliary card coupling means (for reading the account memory and restoring the operation of the case) so that these and the main coupling means are seen as identical (for the insertion of a card into the case and for its gradual consumption).

Hereinafter will be given a detailed description of the invention with reference to the accompanying drawings in which:

FIG. 3 is a block diagram of a card-case assembly showing the different component circuits, FIG. 4 is /a block diagram of a transfer device which can be used in the second embodiment of this invention.

Figures 1, 2:
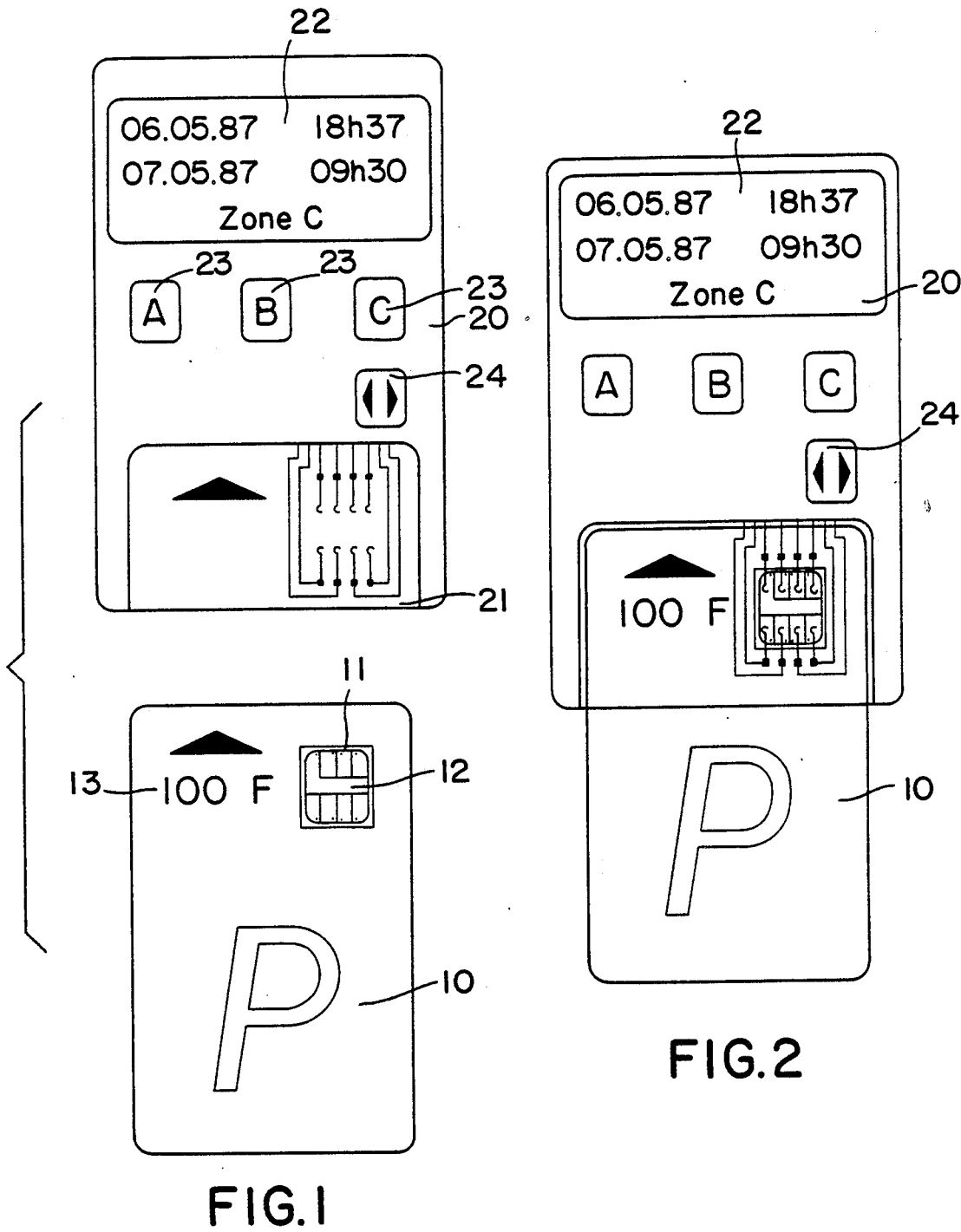
FIGS. 1 and 2 are overall views of a card and a case, respectively before and after the insertion of the card into the case.
Figure 5:
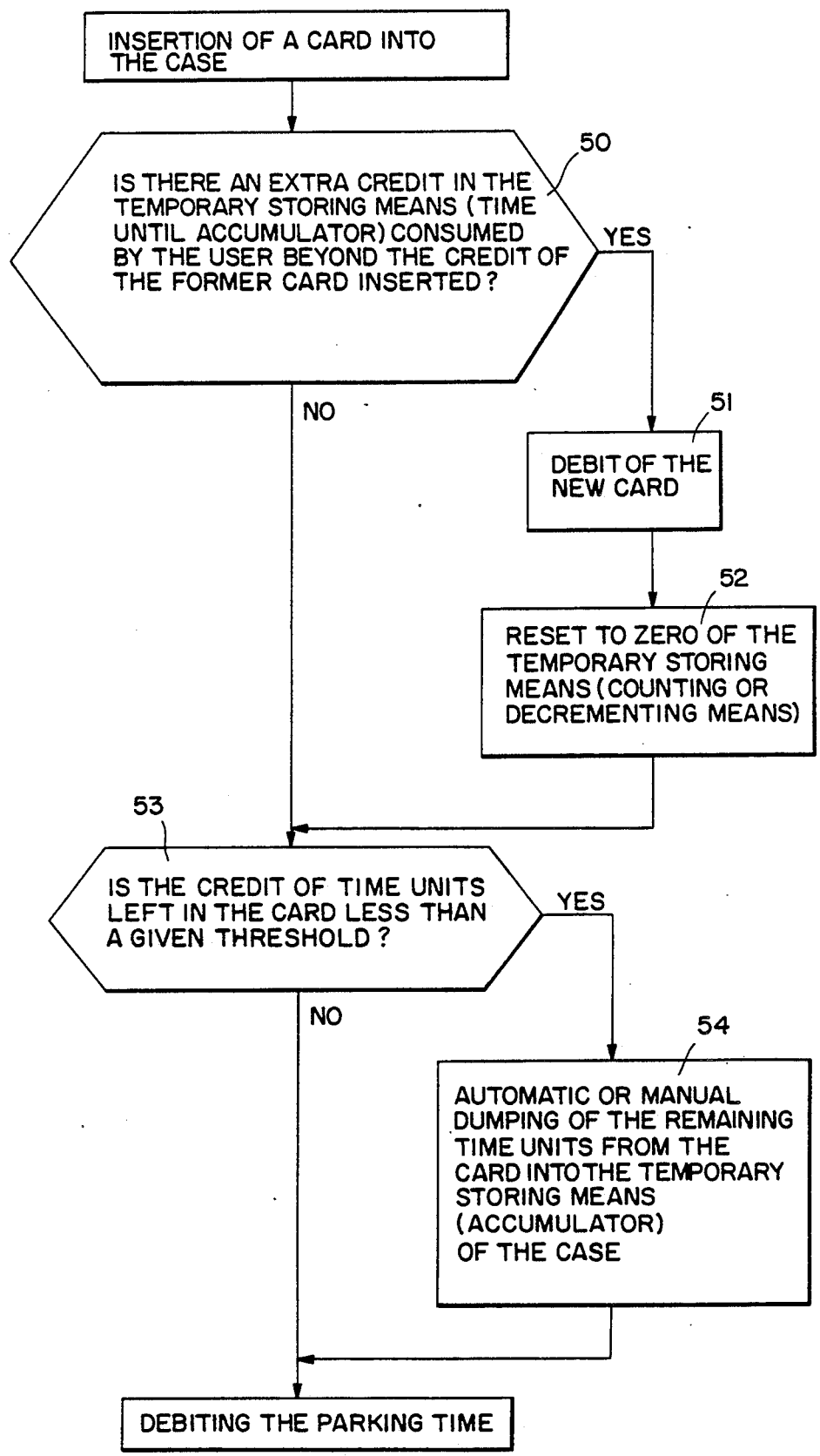
FIGS. 5-8 are flow charts showing the larger operation of the invention.
Figure 6:
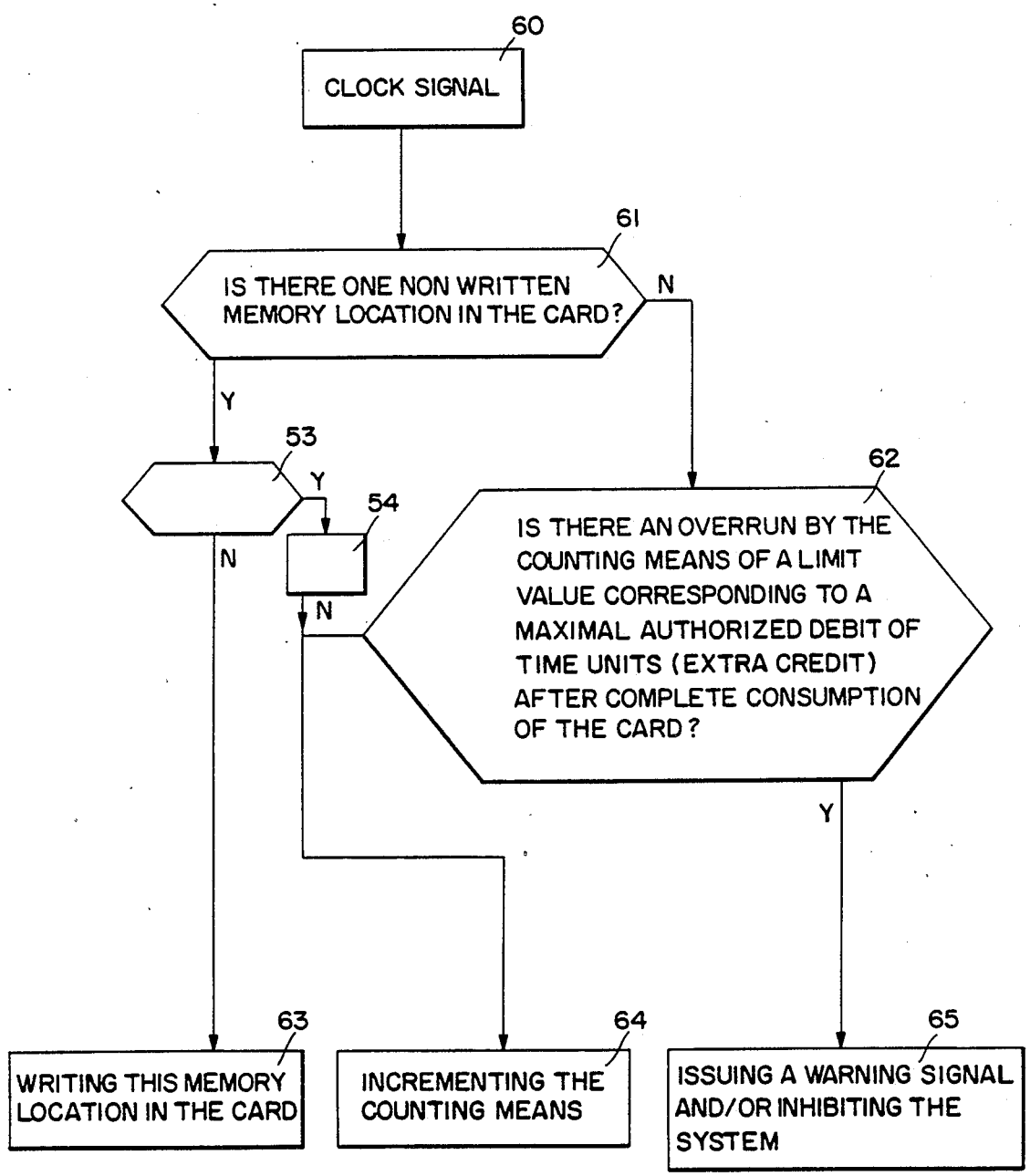
Figure 7:
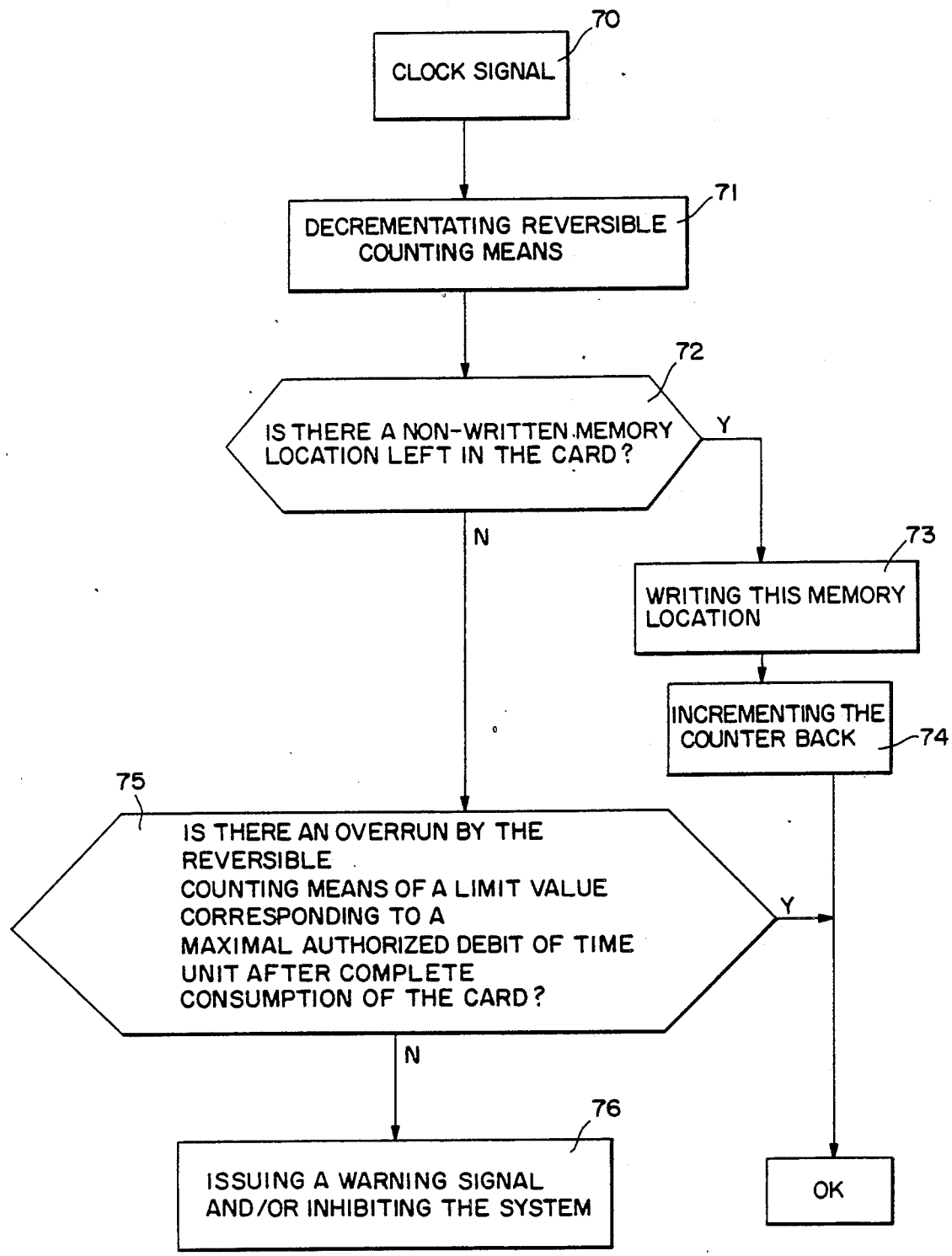
Figure 8:
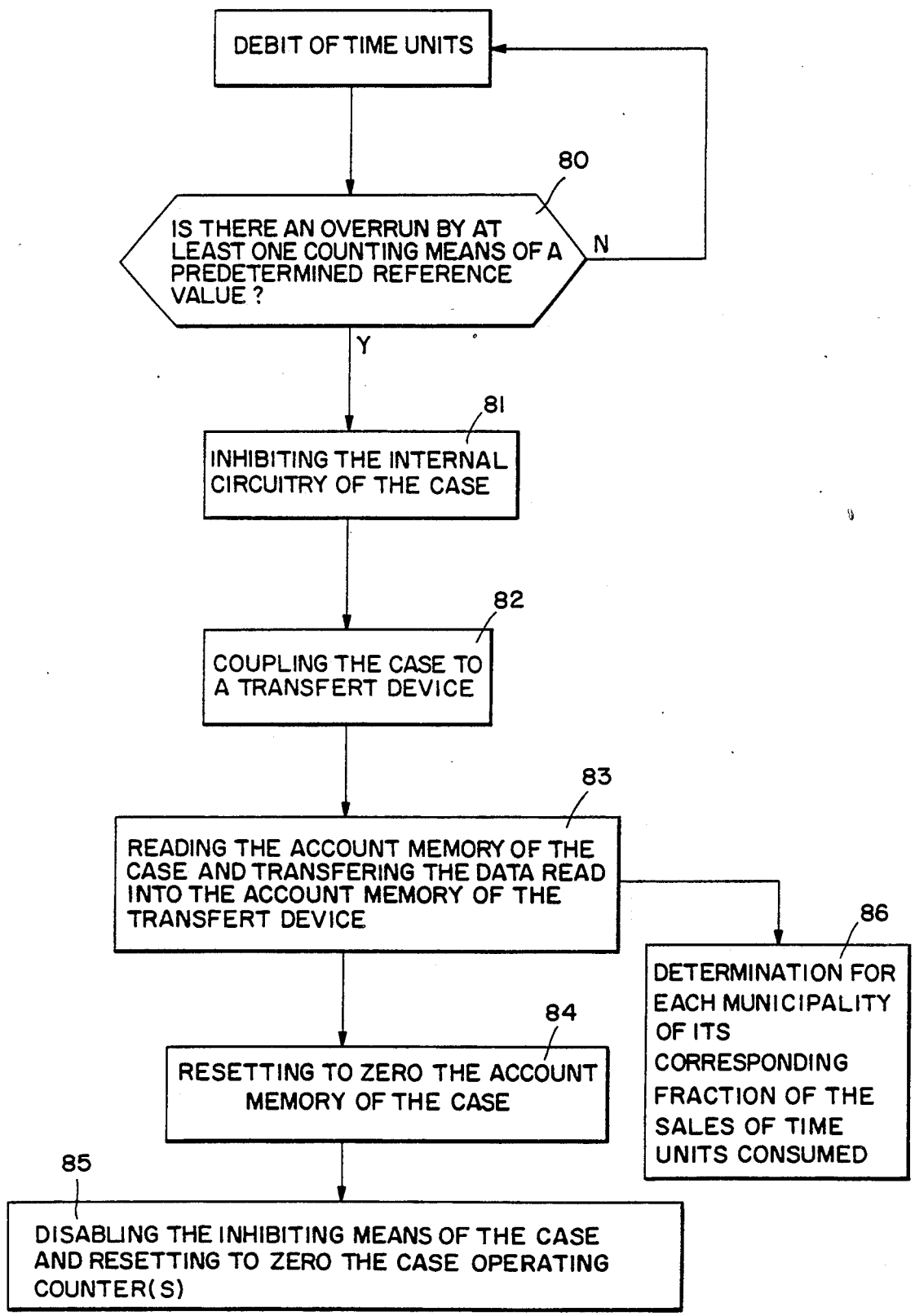

In FIG. 1, reference 10 denotes a card of a micro-circuit card type comprising an electronic circuit having a plurality of contacts 11 connected to a PROM type memory 12. This memory includes a plurality of locations written successively and irreversibly.

A chip used could be, for instance, an ET 1001 produced by EUROTECHNIQUE.

The card also contains an indication 13 of a monetary value corresponding to the number of memory locations i.e. 100 Francs for 100 memory locations, each corresponding to 1.00 Franc or 200 memory locations, each corresponding to 0.50 Franc, etc.

Case 20 includes a receptacle 21 receiving the card 10, a display screen 22 and a number of keys 23, 24.

Preferably, receptacle 21 will be of transparent material to leave the entire surface of the card visible from the outside, in particular a memory chip, even when the card has been inserted into the case.

In a first embodiment shown in FIGS. 1 and 2, the case includes keys 23 designed to set a parking rate (rate A, B or C) and a key 24 for changing cards, the function of which will be explained later.

A display 22 displays the current date and time, the authorized parking limit date and time, and the rate A, B or C, corresponding to the buttons 23 pressed beforehand by the user.

The displayed parking limit time corresponds to a maximum authorized parking time (e.g. 2 hours) which may depend upon rate A, B or C and which will take account of free parking periods (nights, Sundays and legal holidays).

However, after inserting the card, if the credit in time units left in the card is less than the authorized time prescribed, the possible limit time, taking account of the credit left in the card, then takes the place of the authorized limit time and an indication (flashing or display of an indicator) warns the user that the card he has just inserted will not fully cover the maximum authorized parking time.

If this is the case, the user can then press button 24 to change the card so that the balance of time units left in the card will be "dumped" into a memory of the case forming an accumulator. Subsequently, the user can remove the card which has been depleted in order to substitute a new card which may take over from the accumulator if the parking time has to be extended to the authorized limit.

This feature enables a user to fully utilize parking cards even if a small amount is left without any need to go back to his vehicle to replace the depleted card by a loaded card.

The balance of the card can be loaded automatically into the accumulator as soon as the case detects the fact that the remainder is below a given threshold.

As an alternative, or in addition to the accumulator, for the user to be able to park beyond the credit in the number of time units corresponding to the card inserted into the case, the latter can include means for counting a debit balance of time units, means for periodically determining whether there is a non-written memory location in card and, in affirmative, writing this memory location or, in the negative, incrementing the means of counting and the means of detecting and indicating an overrun by the counting means of a limit value corresponding to a maximal authorized debit of time units after a complete consumption of the card inserted in the case.

In addition, there are means provided for the resetting to zero of the counting means by the insertion of a new card into the case with corresponding entry of a number of memory locations in this new card, corresponding to the account value reached by the counting means.

Also, as an alternative, or in addition to the accumulator, the case can similarly include a reversible counting means forming a time unit buffer, means for periodically decrementing this counter under the control of the clock circuit gradually as the time elapses, means for determining at each of these decrementations whether there is a non-written memory location left in the card, and in the affirmative, writing this memory location and incrementing the counter again in a concomitant manner, and means of detecting and indicating the overrun in the decrementation direction of a limit value corresponding to a maximum authorized debit of time units after complete consumption of the card inserted into the case.

The system then includes means of re-establishing the consumed credit i.e. restoring to their initial value account the counting means by the insertion of a new card into the case and for writing, in a concomitant manner, a number of memory locations of such new card corresponding to the difference between the initial account value and the account value reached, in the decrementation direction by the counting means. On the other hand, it will also be possible to provide a numeric or alphanumeric keypad on the case so that the user can enter a code number (either a code related to the vehicle—for instance, the registration number—or a code specific to the user) which code will then be compared with a stored code; the operation of this system is only authorized if the two codes match.

The comparison means can be located in the case or in the card as we.. In the latter case, this configuration offers the advantage of reinforced protection because it is absolutely impossible to read the code out of the card, as the counterpart of the micro-circuit will be more complex.

Such a prior check of a code enhances the safety of the system, particularly if it is desirable to use cards of high value. Indeed, even if the card (which is to remain in the vehicle necessarily, with the case, during the entire parking period) is stolen, the thief cannot use it because it is impossible for him to know the code contained in the card, or because the code is related to the vehicle as displayed on the case read-out and cannot be used on any other car.

To avoid fraudulent use by users simulating the breakdown of their case or who deliberately damage their cases, the following are provided for:

an indication on the display which reminds the user in good time that he needs to replace the battery in his case because it is running out; if he does not do so, his appliance will fail and will be processed as a failed case (by drawing up an official report of unauthorised parking); and a self-test device 40, connected to the processor 25, which in the event of failure other than that due to the failure of the batteries, displays on the screen a "failure" signal. In this case the user has a given temporary charge exemption (for instance 12 hours) during which the signal is maintained on this display and no penalty will be applied. At the end of this period, if he has not replaced his defective case against an operational case, the "failure" will no longer be displayed and if parking ensues under such conditions, he will be punishable by fine.

In the second embodiment indicated above, i.e. wherein means is provided 29, for determining, for each municipality, the number of time units consumed in order to distribute to each thereof a fraction of the product of the sales of the cards (depending upon a share proportional to this duration), case 20 will also include a keypad enabling the user to enter code corresponding to the place where he is parking. For instance, the post code of the municipality; this code will be displayed on the screen at the same time as the data concerning the date and the time and the rate data.

On the other hand, still in the second embodiment, the case further comprises:

means for user entry after positioning installation of the card in the case, of a parameter representative of the place of use of the credit in terms of time units;

an account memory cooperating with the writing circuit and entry means to record, on each withdrawal of the card, accounting data comprising a parameter code relating to the place of use and an associated number of memory locations entered between the moment the card is positioned in the case and its withdrawal from said case in such a way that the case can store, gradually during successive uses, data so that the subsequent imputation of time units consumed is possible, to a determined beneficiary related to the location where said units were consumed;

counting means, designed to increment the state of at least one operating counter gradually upon the successive system operations which incrementation or incrementations may particularly be made as a function of the number of memory locations written into the successive cards inserted into the case and/or the number of successive cards inserted into the case and/or the elapsed time since the insertion of the first card into the case;

means for inhibiting the internal circuitry of the case, activated in response to an overrun of a predetermined reference value by at least one of said operating counters in order to render impossible any utilization of the case by its holder once said overrun is accomplished, thus obliging the holder to periodically request the restoring of his case against a transfer of the accounting data contained therein to an external device;

means for displaying the activated or inactivated state of these inhibiting means, an auxiliary coupling means, accessible from outside the case, to these storage means.

To collect and centralize the data accumulated in the account memories of the different cards, the system includes, in addition to the cards and the individual cases, at least one transfer device receiving the cases including:

coupling means designed to cooperate with the auxiliary coupling means of the case so as to permit the setting up of a link between the internal circuits of the transfer device and the case account memory, means of reading the content of the case account memory, an account memory receiving in a cumulative manner the contents of the account memories of the different cases inserted successively into the transfer device, means of resetting to zero of the case account memory, after the reading and transfer of data thereof into the transfer device memory, in order to transfer the account data of a plurality of cases into the transfer device and subsequently to permit determination, for each beneficiary, of a ratio proportional to the number of time units consumed and the distribution to each a fraction of the sales product of the cards as a function of this ratio, and means for disabling the inhibiting means of the case and for resetting to zero the case operating counters activated after reading and transfer of data from the case account memory into the transfer device memory in order to restore the operation of the case once its holder has transferred the data from the account memory into the memory of a transfer device.

FIG. 3 is a schematic illustration of the internal circuits of both the cards and the case.

The card includes, in addition to the PROM 12 memory and the output connections 11, a circuit 14 ensuring the control, protection and memory addressing functions. This card is a known type and will no longer be described in detail. But reference is possible, for instance, to the technical specifications of the aforementioned EUROTECHNIQUE circuit ET 1001, totally suitable for the implementation of this invention.

Case 20 includes a connector 21 co-operating with the contacts of the card in order to exchange therewith data signals ("Out"), control signals A, B and ST (Strobe) and to apply thereto the power supply VCC and VPP programming voltage (whenever it is necessary to write into an additional memory location in PROM 12).

Case 20 includes essentially a processor 25, operating o the basis of a real time crystal quartz clock 26, connected to display 22, to function keys 23 and 24, to a writing circuit 27 supplying under control of processor 25 programming voltage pulses to PROM 12 of the card, as well as intermediate counter 28 serving as said accumulator and/or account memory for a time unit debit remainder (for the possibility of "Overdraft" operations) or for the time unit buffer memory (for "revolving credit" operation capability).

Clock time setting means are also provided for setting the time and taking account of time changes (summer/winter). For instance, these means can be controlled by function keys 23 and 24 with the processor already set to a "time setting" condition (for instance, by simultaneous and/or repeated and/or extended pressing of one or several keys, in the same way as digital watches).

In the case of the second aforementioned embodiment, it is also intended to have an account memory 29 which records, each time the card is withdrawn, accounting data comprising the code of the place of use and the number of time units consumed.

This memory 29 will be unloaded periodically into a transfer device 30 shown in FIG. 4. This device will include connector 31 for coupling with a case (in particular, the same connector 21 that accomodates the cards could be used), with a processor 32 providing for:

transfer of data from memory 29 of the case into memory 33, arranged in a similar manner but with a larger capacity and receiving in a cumulative manner the data from the account memory of the successive cases connected to the transfer device, resetting to zero this account memory 29 (for this purpose, it is possible to use a EEPROM memory), and restoring the operation of the case 29, after transfer of the account data.

What is claimed is:

1. A time accounting system comprising a card (10) and a case (20); said card having an electronic memory (12) with memory locations, each of the memory locations representing a time unit credit allocated to the holder of the card, and each memory location thereof adapted to be individually and irreversibly written, and coupling means (11) for accessing the memory; said case (20) having a clock circuit (26), a writing circuit (27), coupling means (21) for receiving the card and cooperating with the coupling means of the card for enabling a link to be established with the circuits of the case, said writing circuit (27) including means for irreversible writing on the memory locations in the electronic memory (12) of the card (10) received into the case, said writing circuit (27) being periodically triggered under the control of the clock circuit (26) for successively writing the card memory locations and corresponds to gradual consumption, as time elapses, of the time unit credits remaining in the card, and, means (28) for temporarily storing time unit credits, said temporary storing means (28) being activable by said writing circuit (27) in substitution of said electron memory (12) of the card (10) in response to the remaining number of unwritten memory locations representing time unit credits in the card inserted into the case being less than a predetermined quantity.

2. A time accounting system, particularly for accounting parking subject to charge periods, comprising:
   (A) a card (10) or a consumable element consisting of an electronic memory (12) with memory locations each memory location thereof adapted to be individually and irreversibly written, with each of the memory locations representing a time unit credit allocated to the holder of the card, in particular a time unit credit allocated after prior payment, and coupling means (11) accessible from the outside of the card, and
   (B) a case (20), essentially portable, receiving the card (10) and comprising:
   an internal clock circuit (26),
   coupling means (21) designed to cooperate with the coupling means of the card to enable a link to be established between an internal circuit of the case wherein the card is inserted, and
   a writing circuit (27) for irreversible writing of a memory location in the electronic memory (12) of the card (10) inserted into the case which circuit (27) is periodically triggered under the control of the clock circuit (26) so that the successive writings of the memory locations of the card entered into the case corresponds to gradual consumption, as time elapses, of the credit of time units remaining in the card, wherein said system comprises means (28) for temporary storage of a time unit credit, said temporary storage means (28) being activable by said writing circuit (27) in substitution to said electron memory (12) of the card (10).

3. The system of claim 1 wherein the means for temporary storage of a credit of time units comprises:
   counting means (28), forming a time unit accumulator,
   means (54) for loading the accumulator (28), activable so as to write all or part of the memory locations of the card (10) entered into the case, and simultaneously to increment by a corresponding number of units the counting means (28) and
   selector means (61), connected to the coupling means (21) of the case (20) and also to the counting means (28), co-operating with the writing circuits (27) so that periodical triggering of the writing circuit (27) provides either the decrementation (64) of the counting means by one time unit or the writing-in (73) of a memory location of a new card entered into the case to replace the former, whereby, as soon as the accumulator 26 is being loaded with the remaining balance in the card, the user may substitute a new card for the latter, said new card being gradually consumed once the time unit credit corresponding to the balance has been previously used up.

4. The system in claim 2 in which the means (54) for loading the accumulator can be manually activated (24) under the control of the user.

5. The system of claim 2 in which the means (54) for loading the accumulator can be automatically activated under the control of the case (25) as a function of the time credit remaining in the inserted card (10).

6. The system of one of claims 1 to 4 or 1 wherein the means for temporary storing of a time unit credit comprises:
   means (28) for counting a time unit debit balance,
   means (61) for periodically determining whether there is a non-written memory location in the card (10) and, in the affirmative, for writing this location in the memory (12) or, in the negative, for incrementing the counting means (28), and
   means (62) for detecting and indicating the overrun by the counting means on a limit value corresponding to a maximum authorized debit time unit, after complete consumption of the card inserted into the case, in order that the user be given the opportunity to park beyond the time unit credit corresponding to the card entered into the case.

7. The system of claim 5 comprising means (52) for resetting to zero the counting means on insertion of a new card in the case with simultaneously writing-in (51) a number of memory locations in this new card, corresponding to the account value reached by the counting means (28).

8. The system of one of claims 1 to 4 or 1 wherein the means (28) for temporary storage of a time unit credit comprises:

reversible counting means (28) forming a time unit buffer, means (71) for periodically decrementing this counter under the control of a clock circuit (26, 70) gradually as time elapses, means (72) for determining, on each of these decrementations, whether the card (10) has an unwritten memory location and in the affirmative, writing (73) this location in the memory (12) and incrementing again the counter (28) in a concomitant manner, and means (75) for detecting and indicating the overrun, in incrementation direction, of a limit value corresponding to maximum authorized debit time units after complete consumption of the card inserted into the case, in order that the user can be given the opportunity to park beyond the time unit credit corresponding to the card inserted into the case.

9. The system of claim 7, comprising means (52) for restoring to their initial account value the counting means on insertion of a new card in the case, and for writing (51) in a concomitant manner a number of memory locations in this new card corresponding to the difference between the initial account value and the account value reached, in the decrementation direction, by the counting means.

10. The system of one of the claims 1-4 or 1 wherein the card is of the micro-circuit type card therein including, in addition to its memory (12), means (13) for addressing and controlling this memory.

11. The system of one of the preceding claims 1-4 or 1 wherein the case (10) comprises in addition a self-test device and means (22) for displaying a negative result of this self-test.

12. The system of claim 11 wherein the display of the negative results of the self-test is limited in time to a predetermined time of temporary accounting exemption in order to visually indicate, by display lacking, the expiry of this temporary exemption duration.

13. The system of any one of the claims 1-4 or 15 wherein:

(1) the case further comprises:

means (23, 24) for user entry, after positioning of the card (10) in the case (20), of a parameter representative of the place of use of the time unit credit, an account memory (29), cooperating with the writing circuit (27) and the entry means (23, 24), to record on each withdrawal card accounting data comprising the parameter code ($29_1$) representative of the place of use and/or the associated ($29_2$) number of memory locations written between the moment of the card positioning in the case and that of its withdrawal therefrom, in order that the case can store gradually, upon successive uses, data to permit subsequent imputing of the consumed time units to a definite beneficiary related to the place where the units were consumed, counting means (25) for incrementing the state of at least one operation counter (28) upon the successive system operations while these incrementations can notably be made as a function of the number of memory locations written into the successive cards inserted into the case and/or the elapsed time since the insertion of the first card into the case, means (81) for inhibiting the internal circuits of the case, activated in response to the overrun (80) of a predetermined reference value by at least one of said operation counters (28), in order to render impossible any use of the case by its holder once this overrun has occurred thus compelling the holder to periodically request restoring of the case against transfer contained therein to an external device (30) of the accounting data, means (22) for displaying the activated or inactivated state of these inhibiting means (65), and auxiliary coupling means (21), accessible from outside the case, to these storage means, (2) the system further comprises:

(c) a transfer device (30) receiving the case and comprising:

coupling means (31) designed to cooperate with the case auxiliary coupling means (21) so as to permit the establishing of a link between the internal circuits (32, 33) of the transfer device (30) and the case account memory (29), means (32) for reading (83) the contents of the account memory of the case, an account memory (33) receiving, in a cumulative manner, the contents of the account memories (29) of the different cases (20) inserted successively into the transfer device, means (32) for resetting to zero (82) the case account memory (29) after reading and transfer of its data into the transfer device memory (30), in order to transfer the account data from a plurality of cases into the transfer device and thereby allow subsequent determination for each beneficiary of a ratio proportional to the number of time units consumed and the distribution to each of them of a fraction of the sales product of the cards depending on this ratio, means (32) for disabling the case (85) inhibiting means (81) and resetting (85) to zero the case operation counter(s) activated after reading and transfer of data from the case account memory (29) into the transfer device memory, in order to restore the operation of the case once the holder has transferred the data from the account memory into the memory of a transfer device.

14. The system of claim 13, wherein the account memory (29) can be separated from the case.

15. The system of claim 13, wherein the auxiliary card coupling means (21) are the same means as the main coupling means.

* * * * *